(12) United States Patent
Patil et al.

(10) Patent No.: US 12,522,563 B2
(45) Date of Patent: Jan. 13, 2026

(54) UREA PRODUCTION WITH REDUCED UREA LOSSES

(71) Applicant: Stamicarbon B.V., Sittard (NL)

(72) Inventors: Rahul Patil, Sittard (NL); Lambertus Wilhelmus Gevers, Sittard (NL); Chuanbo Gao, Sittard (NL)

(73) Assignee: Stamicarbon B.V., Sittard (NL)

(*) Notice: Subject to any disclaimer, the term of this patent is extended or adjusted under 35 U.S.C. 154(b) by 0 days.

(21) Appl. No.: 18/877,886

(22) PCT Filed: Sep. 6, 2024

(86) PCT No.: PCT/NL2024/050484
§ 371 (c)(1),
(2) Date: Dec. 20, 2024

(87) PCT Pub. No.: WO2025/053753
PCT Pub. Date: Mar. 13, 2025

(65) Prior Publication Data
US 2025/0162983 A1 May 22, 2025

(30) Foreign Application Priority Data

Sep. 8, 2023 (EP) .................................. 23196347
Mar. 8, 2024 (EP) .................................. 24162360

(51) Int. Cl.
*C07C 273/16* (2006.01)
*C05C 1/00* (2006.01)
*C05G 5/20* (2020.01)

(52) U.S. Cl.
CPC .............. *C07C 273/16* (2013.01); *C05C 1/00* (2013.01); *C05G 5/20* (2020.02)

(58) Field of Classification Search
None
See application file for complete search history.

(56) References Cited

U.S. PATENT DOCUMENTS

| | | |
|---|---|---|
| 2013/0207035 A1 | 8/2013 | Meessen |
| 2018/0071653 A1 | 3/2018 | Dobree et al. |
| 2019/0185422 A1 | 6/2019 | Pustjens et al. |
| 2022/0289669 A1 | 9/2022 | Bynes et al. |

FOREIGN PATENT DOCUMENTS

| | | |
|---|---|---|
| NL | 8900055 A | 8/1990 |
| WO | 2019093891 A1 | 5/2019 |
| WO | 2020130817 A1 | 6/2020 |
| WO | 2023158303 A1 | 8/2023 |

OTHER PUBLICATIONS

"The world melamine industry" Nitrogen, Jul.-Aug. 1997, Issue No. 228; 9 pages.
Meessen, "Urea", Ullmann's Encyclopaedia of Industrial Chemistry, 2010; 39 pages.
International Search Report and Written Opinion mailed Dec. 9, 2024 for the corresponding PCT Application No. PCT/NL2024/050484; 12 pages.

*Primary Examiner* — Amy C Bonaparte
(74) *Attorney, Agent, or Firm* — Leason Ellis LLP

(57) ABSTRACT

The disclosure pertains to a urea production process wherein vapor from an evaporation unit for concentrating urea solution is condensed and the resulting process condensate, which contains urea originating from urea entrained in the vapor, is combined with a second urea solution to obtain a dilute urea solution that is suitable e.g. for DEF.

21 Claims, 1 Drawing Sheet

UREA PRODUCTION WITH REDUCED UREA LOSSES

CROSS-REFERENCE TO RELATED PATENT APPLICATIONS

This application is a U.S. National Stage Application under 35 U.S.C. § 371 of International Patent Application No. PCT/NL2024/050484 filed Sep. 6, 2024, which claims the benefit of priority of European Patent Application numbers 23196347.1 filed Sep. 8, 2023, and 24162360.2 filed Mar. 8, 2024, all of which are incorporated by reference in their entireties.

FIELD

The invention pertains to the production of urea.

INTRODUCTION

Various urea production plants and processes are illustrated in Ullmann's Encyclopaedia of Industrial Chemistry, Chapter Urea, 2010. Urea plants frequently comprise an HP synthesis section and a downstream LP dissociator for purifying the urea solution. In most urea plants, the vapor from the LP dissociator is condensed in an LP carbamate condenser and is recycled to the urea synthesis section as a carbamate solution, to recover $NH_3$ and $CO_2$. The water content of the carbamate recycle stream is desirably low due to the detrimental effect on the dehydration of carbamate to urea in the synthesis section.

In many urea plants, the urea solution is concentrated by water evaporation downstream of the LP dissociator to form a concentrated urea solution (which term includes urea melts with e.g. up to 99 wt. % urea) in an evaporator, often by evaporation under a pressure below 4.0 bar, in particular below 1.0 bara (bar absolute). The resulting vapor contains entrained urea droplets and is condensed in one or more units to give an aqueous process condensate which contains water, carbamate, ammonia, and also some urea. The water content is too high to supply the aqueous process condensate to the LP carbamate condenser or to recycle it to the HP synthesis section. The concentration is for instance necessary to prepare urea products which are required to have a higher urea concentration and lower water concentration than the urea solution from the LP dissociator has, for instance to prepare a urea melt.

It is generally desired to achieve a high conversion of feed to urea product. In particular, losses of already formed urea should be minimized.

For instance, NL8900055A teaches that in a first stage of concentrating a urea solution by evaporation, the conditions are so mild that urea hydrolysis and biuret formation, and the accompanying formation of ammonia, only take place to a small extent.

SUMMARY

The invention aims to provide, in certain aspects, a urea production plant and process with low urea losses, i.e. wherein a high fraction of the urea that is produced in the synthesis section is included in the urea product. Further advantages and aims of the invention are discussed hereinafter.

The invention pertains in a first aspect to a process of preparing a concentrated urea-containing liquid stream, the process comprising: subjecting a first urea-containing solution which is a urea solution comprising urea, water, ammonia, and carbamate to a low pressure carbamate decomposition step at a pressure of 1.0 to 10 bara and subsequently at least in part to concentration by water evaporation giving a concentrated urea-containing liquid stream and a first vapor, wherein the water evaporation is preferably carried out at a pressure below 1.0 bara; subjecting the first vapor to condensation thereby forming a first process condensate comprising water, urea, carbamate, and ammonia; and combining the first process condensate, which contains water and urea, with a second urea-containing solution that contains at least 30 wt. % urea, the combining being before, during or after desorption of $NH_3$ and $CO_2$, to form a dilute urea solution that has a molar ratio of water to urea above 1.0 and/or comprises at least 25 wt. % water, and that is preferably suitable for NOx abatement, more preferably for use as Diesel Exhaust Fluid optionally after dilution with water.

Herein, the first process condensate and the second urea-containing solution are two liquid streams, both aqueous liquid streams, and are combined e.g. by mixing the two liquid streams into a single liquid stream, namely the dilute urea solution. The method involves, preferably:

A) combining the first process condensate with the second urea-containing solution before desorption of $NH_3$ and $CO_2$ to form a dilute urea solution, i.e. with desorption of $NH_3$ and $CO_2$ after the step of combining (e.g. mixing) the liquid streams from the combined liquid stream, i.e. from the dilute urea solution; or B) combining the first process condensate with the second urea-containing solution during the desorption of $NH_3$ and $CO_2$ to form a dilute urea solution; i.e. with simultaneously combining the two urea solutions and subjecting them to desorption; or, C) combining the first process condensate with the second urea-containing solution after the desorption of $NH_3$ and $CO_2$ to form a dilute urea solution, i.e. with desorption of $NH_3$ and $CO_2$ from the first process condensate and/or from the second urea-containing solution before combining said liquid streams, or a combination of A and B, or of B and C, or of A and C, or of A, B and C. The step of desorption of $NH_3$ and $CO_2$ preferably involves dissociation of carbamate from the liquid by heating, e.g. with steam stripping.

Also provided is a plant for the production of urea, the plant comprising: a high pressure urea synthesis section; a low pressure dissociation unit connected to receive urea solution from the high pressure urea synthesis section; an evaporation unit connected to receive urea solution from the low pressure dissociation unit and having an outlet for a first vapor and an outlet for a concentrated urea-containing liquid stream; a first condensation unit connected to receive the first vapor from the evaporation unit; a mixing zone and a desorption unit configured to combine a first process condensate from the first condensation unit with a second urea solution and to subject the first process condensate to desorption of $NH_3$ and $CO_2$ before, during, or after said combining; wherein the plant is preferably suitable for the process of the invention.

Also provided is a method of modifying an existing urea plant, the exiting plant comprising: a high pressure urea synthesis section; a low pressure dissociation unit connected to receive urea solution from the high pressure urea synthesis section; an evaporation unit connected to receive urea solution from the low pressure dissociation unit and having an outlet for a first vapor and an outlet for a concentrated urea-containing liquid stream; a first condensation unit connected to receive the first vapor from the evaporation unit; a wastewater treatment section connected to receive a first process condensate from the first condensation unit; wherein the method comprises: providing the plant with a liquid flow connection for the first process condensate from the first condensation unit to a mixing zone to combine the first process condensate with a second urea solution and to subject the resulting combined stream to desorption of $NH_3$ and $CO_2$ before, during, or after said combining; wherein the modified plant is preferably a plant according to the invention.

The disclosure generally pertains to a urea production process and plant wherein vapor from an evaporation unit for concentrating urea solution is condensed and the resulting process condensate, which contains urea originating from urea entrained in the vapor, is combined with a second urea solution to obtain a dilute urea solution that is suitable e.g. for DEF.

DETAILED DESCRIPTION

Figure 1:
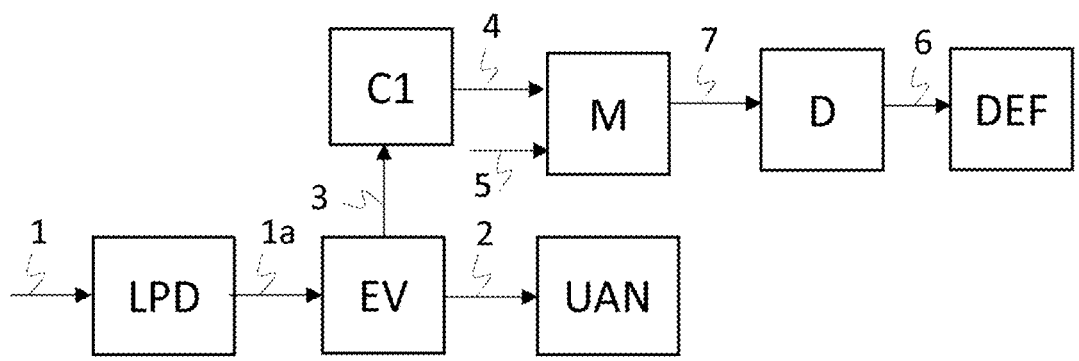
FIG. 1 schematically illustrates an example process and plant according to the invention.

The invention is broadly based on the judicious insight that an improved urea yield can be achieved by switching to a multi-product process and modifying the handling of the aqueous process condensate from the evaporator. In particular, the process comprises combining aqueous process condensate from the evaporation section condenser, i.e. the first process condensate, before, during or after desorption of $NH_3$ and $CO_2$ with a second urea solution to form a combined stream such that a high purity, dilute urea solution is formed. In an embodiment, the process comprises subjecting aqueous process condensate from the evaporation section condenser, which contains water, ammonia, carbamate, and urea, to desorption of $NH_3$ and $CO_2$, and combining the resulting liquid stream, which contains urea and water, with a second urea solution to provide a high purity, dilute urea solution. In another embodiment, the process comprises combining aqueous process condensate from the evaporation section condenser, which contains water, ammonia, carbamate, and urea with the second urea solution and the resulting combined stream is subjected to the desorption of $NH_3$ and $CO_2$ to provide the high purity, dilute urea stream.

The dilute urea stream has a molar ratio of water to urea above 1.0, e.g. above 1.10, and/or comprises at least 25 wt. % water, e.g. at least 40 wt. % or at least 50 wt. % water, or depending on the type of DEF that is preferably produced, even at least 60 wt. %, balance generally urea and max. 2.0 wt. %, preferably max 1.0 wt. %, other components than water and urea.

The dilute urea stream typically has a higher water content (wt. %) than the concentrated urea solution from the evaporator; and typically a higher water content than the second urea solution; and typically also a higher water content that urea synthesis solution at the outlet of the urea synthesis zone from which the second urea solution originates, e.g. a higher water content than the stripped urea solution; in all cases preferably at least 10 wt. % or at least 20 wt. % higher water content (percentage point).

The high purity of the urea solution indicates in particular, low alkalinity. The high purity of the urea solution makes it suitable for NOx abatement, in particular for use as DEF (diesel exhaust fluid).

In the prior art, the aqueous process condensate from an evaporation section of a urea plant is usually supplied to a waste-water treatment section (WWT) to be cleaned; this section is also known as a process condensate treatment section.

For instance, typically the WWT of a urea plant is based on the desorption of $NH_3$ and $CO_2$ and the hydrolysis of urea, using heating and the injection of live steam. In an example WWT section a hydrolyser is used for hydrolysis of urea to $NH_3$ and $CO_2$ by injection of steam at 170° C. to 230° C. (steam pressure at least 15 bara, e.g. 15-25 bara) at a pressure of at least 10 bar into the urea solution, e.g. at 10-30 bar. The hydrolysis unit uses e.g. about 5 kg of 15-25 bara steam per 100 kg condensate to be treated, with e.g. about 1 wt. % urea in the condensate. This is combined with a desorber based on steam stripping by the injection of steam at 1.0 to 5 bara for the removal of $NH_3$.

In some embodiments, a first part of the desorber is arranged upstream (for liquid) of the hydrolyser and a second part downstream. Gas from the desorber is condensed at 2.0 to 4.0 bara and the resulting lean carbamate solution is usually supplied to the condenser of the LP recovery section. In another type of WWT, the hydrolyser is operated with steam at about 235° C. and about 35 bar.

Usually, LP steam (at 4 to 5 bara, e.g. at about 150° C.) as produced in the urea synthesis section (in particular from boiler feed water used as cooling liquid in the HP carbamate condenser) can be used for the desorbers, but not for the hydrolysis unit which uses steam of at least 15 bara and which is hence a steam consuming unit. The HP steam (>15 bara) is imported, e.g. through the HP $CO_2$ compressor of the synthesis section.

The present invention advantageously avoids the loss of urea in the hydrolysis unit of the WWT by the measures of subjecting the aqueous process condensate to desorption of $NH_3$ and $CO_2$ and using the condensate which still contains urea, i.e. without subjecting to a urea hydrolysis treatment, to prepare a low alkalinity, relatively dilute, urea solution, in combination with a second urea solution. The low alkalinity urea solution is in particular useful for making Diesel Exhaust Fluid and similar NOx abatement urea products. Hence, the use of a multiproduct configuration in combination with the modification with respect to the WWT used in the prior art, ensures that a higher fraction of the urea contained in the solution subjected to evaporation, is included in a useful urea product.

In contrast, in the art, high purity water streams are used to dilute urea solutions from urea synthesis to make DEF. In a typical embodiment, DEF is a 32.5 wt. % urea solution in demineralized water with a composition that has maximum 0.3 wt. % biuret and maximum 0.2 wt. % of alkalinity as ammonia; other urea concentrations are also possible.

An early method for the production of Diesel Exhaust Fluid (DEF) is by dissolving a solid urea product, in demineralized water. US20130207035A1 describes using a urea aqueous solution obtained directly from or after a recovery section of a urea production plant, and to dilute said urea aqueous solution with water to obtain the desired solution.

US20190185422 mentions that dilution water for making DEF is e.g. demineralized water (e.g. de-ionized water) from a utility plant, or e.g. purified process condensate e.g. from another plant (such as an upstream gasification or ammonia plant), or from e.g. the urea process if the urea plant includes a waste water treatment section. The dilution water can also be e.g. steam condensate from the steam system of the plant or from another (utility) plant.

WO 2023/158303 describes process wherein water vapor removed in an evaporation section of a urea plant is condensed and the condensate is sent to a waste water treatment (WWT) section, which comprises a hydrolyser and a desorber. Cleaned process condensate from the WWT is used for making DEF, in particular by dilution of a urea solution.

US20180071653 describes a process for the integrated production of urea ammonium nitrate (UAN) and an aqueous urea solution, wherein pressurized urea solution is used directly from the recovery section. An important benefit of the process is stated in the document to be that it is possible to produce the urea for DEF and for UAN in a urea stripping production unit without an evaporation section and a wastewater treatment section. In an alternative embodiment of the document, the plant is fully equipped with, downstream of the synthesis and recovery sections, also an evaporation section, and a waste water treatment section.

The present invention departs from said teachings in the prior art by including the aqueous process condensate from the evaporation section in the high purity dilute urea solution in such manner that the urea contained in the condensate is usefully included in the high purity dilute urea solution. In this way, the fraction of the amount of urea prepared in the urea synthesis that is included in the urea products is advantageously increased.

The dilute urea solution in particular meets the purity specifications for DEF urea products. Diesel Exhaust Fluid (DEF) refers to a high purity type of urea solution that is used for NOx abatement of flue gas, e.g. for catalytic selective reduction, or for thermal reduction. There is a requirement for very high purity of DEF, e.g. for use in catalytic selective reduction systems. For example, DEF is used in vehicles with diesel engines for NOx emissions abatement. The composition of DEF for vehicles is standardized in ISO 22241-1. DEF for vehicles has about 32.5 wt. % urea (i.e. essentially the eutectic composition) and also has very low impurities. ISO 22241-1, e.g. the 2006 edition, specifies a limit for alkalinity as $NH_3$ of less than 0.2 wt. %; some commercial DEF solutions have an alkalinity as $NH_3$ as low as 200 ppm by weight. Other DEF specifications are also available, e.g. AUS-40 with 40% urea and AUS-50 with 50 wt. % urea, e.g. for marine and industrial NOx abatement uses. DEF as used herein covers all these specifications. DEF is generally a relatively dilute urea solution, e.g. at least 25 wt. % water, typically with at least 98 wt. % water and urea in total. A relatively high water content is advantageous for DEF to reduce the risk of urea crystallization at low temperatures.

Low alkalinity is desirable for DEF in order to reduce the risk of corrosion of equipment in contact with the DEF solution. Alkalinity as $NH_3$ refers to the $NH_3$ concentration that is calculated on the basis of the measured or actual alkalinity of the solution and assuming that the alkalinity is due to only $NH_3$. A low concentration of ammonia is desired to minimize olfactory impact of the DEF product and to avoid harmful situations when DEF is handled by consumers during the manual filling of vehicles with DEF.

The purity specification for DEF is significantly different for urea fertilizer products.

Preferably the dilute urea solution consists of water, urea and max 2.0 wt. % other compounds in total.

The low alkalinity is e.g. specified as that the urea solution has an alkalinity as $NH_3$ weight concentration of less than 0.62% of the urea weight concentration of the low alkalinity urea solution. In other words, the $NH_3$ concentration of the solution calculated on the basis that the alkalinity of the solution is only caused by $NH_3$, has a ratio to the urea concentration of the solution (wt. % to wt. %) of less than 0.0062.

The alkalinity level can alternatively or in addition be specified as that the low alkalinity urea solution contains 16.25-75 wt. % urea and has an alkalinity as $NH_3$ of less than 0.10 wt. % $NH_3$ on the basis of 16.25 wt. % urea, i.e. when diluted by adding pure water ($H_2O$) to reach 16.25 wt. % urea if the urea concentration is higher than 16.25 wt. % urea.

The alkalinity level can alternatively or in addition be specified as that the low alkalinity urea solution contains at least 32.5 wt. % urea and has an alkalinity as $NH_3$ of less than 0.20 wt. % $NH_3$ on the basis of 32.5 wt. % urea, i.e. when diluted by adding pure water ($H_2O$) to reach 32.5 wt. % urea if the urea concentration is higher than 32.5 wt. % urea.

Preferably, the low alkalinity urea solution comprises impurities in agreement with the envisaged use as NOx abatement fluid or dilution to NOx abatement fluid, for instance for use as DEF or for the dilution to DEF by addition to water (DEF precursor), for example DEF in compliance with ISO 22241-1, e.g. edition 2006 or 2019 (i.e. with 32.5 wt. % urea) and/or ISO 186111-1:2014. Preferably, the low alkalinity urea solution comprises impurities in agreement with the envisaged use as DEF 40% or DEF 50%.

Accordingly, in view of the desired use for NOx abatement, preferably biuret is max. 0.3 wt. %. Preferably carbonate as $CO_2$ is 0.2 wt. % max. Furthermore, preferably, aldehydes are max 5 ppm (by weight) and/or insoluble matter is max 20 ppm (by weight). Preferably, $PO_4$, Ca, Fe, Al, Mg, Na and K are each max 0.5 ppm. Cu, Zn, Cr and Ni are preferably each max 0.2 ppm (all ppm by weight). For DEF precursor solution, the impurities are preferably such that said impurities are obtained after dilution by adding $H_2O$ to the urea content of the DEF specification.

Optionally, the process comprising metering the dilute urea solution, optionally after dilution by addition of water, in batches of urea solution; the batches having a controlled amount of urea solution. The batches are e.g. received by a holding unit such as a container, packaging, or transport unit for transporting batches of urea solution, such as a ship. The batches of urea solution preferably meet the DEF specification. The holding unit can be closed, and optionally the process comprises a step of closing the holding unit containing the batch of urea solution.

The LP carbamate dissociation, carried out in an LP dissociation unit, involves heating of the urea solution (first urea-containing solution and/or second urea solution) at a pressure in the LP range of 1.0 to 10 bara, preferably 2 to 8 bar, and gas/liquid separation, usually in a shell-and-tube heat exchanger. Carbamate dissociates and is removed from the liquid as $CO_2$ and $NH_3$. The gas comprising $CO_2$ and $NH_3$ is typically condensed in an LP carbamate condenser and the resulting LP carbamate solution is typically supplied, by a liquid flow line, directly or indirectly to the reaction zone of the HP synthesis section. Hence usually the LP dissociation unit is part of an LP recovery section of the urea plant.

The urea solution after the LP dissociation typically comprises 55 to 75 wt. % urea, e.g. 60 to 70 wt. % urea; and 20 to 40 wt. % water, and carbamate, e.g. at least 0.5 wt. %, $CO_2$ and at least 0.5 wt. % $NH_3$; and e.g. max 2.0 wt. % $CO_2$ and e.g. max 2.0 wt. % $NH_3$ (concentrations including $CO_2$ respectively $NH_3$ present as carbamate). These preferred compositions apply in particular to the urea solution received by the evaporation unit and to the second urea solution, and can be obtained after the optional LP stripping and atmospheric flashing.

The LP urea solution from the LP dissociator typically has a temperature of at least 80° C.

The urea solution from the LP dissociator is e.g. reduced in pressure to atmospheric pressure (1.0 bara), with gas/liquid separation (atmospheric flashing), and then supplied to the evaporation unit. Suitably, the urea solution from the LP dissociator is subjected to adiabatic stripping by countercurrent contact with gaseous $CO_2$, e.g. a part of e.g. 1 to 10% the $CO_2$ feed, preferably 1 to 5% of the $CO_2$ feed of the urea synthesis section, at LP and subsequently expanded to atmospheric pressure with atmospheric flashing. Gas from the LP stripper is supplied e.g. to the LP carbamate condenser, to advantageously reduce the ratio $NH_3$ to $CO_2$ (including as carbamate) in the LPCC. The LP stripping also reduces the $NH_3$ to $CO_2$ ratio (including as carbamate) of the urea solution which is advantageous for downstream processing of it. The adiabatic LP stripping is especially advantageous in combination with MP treatment, such as MP flashing of the urea solution upstream of the LP dissociation.

Preferably, the LP urea solution is divided, preferably after the atmospheric flashing, in a first part that is subjected to the evaporation, and a second part that is used as the second urea solution, is preferably combined with the first process condensate. The second urea solution, as combined with the first process condensate, preferably comprises 55 to 75 wt. % urea, e.g. 60 to 70 wt. % urea; and 20 to 40 wt. % water, and carbamate, with the carbamate for example included as at least 0.5 wt. %, $CO_2$ and at least 0.5 wt. % $NH_3$; and preferably max 2.0 wt. % $CO_2$ and preferably max 2.0 wt. % $NH_3$ (concentrations including $CO_2$ respectively $NH_3$ present as carbamate). The water content of at least 20 wt. % of the second urea solution, provides a difference with concentrated urea solutions obtained from a pre-evaporator or evaporator. A relatively high water content of at least 20 wt. % of the second urea solution is advantageous for making DEF.

Gas from the atmospheric flash is suitable condensed in an atmospheric condenser, with the resulting carbamate solution preferably supplied to the LPCC.

At least a part of the first urea solution is subjected, subsequent to the LP dissociation, to concentration in an evaporation unit (evaporator) by water evaporation, and gas/liquid separation, preferably at a pressure below 1.0 bara, e.g. at a pressure above 0.10 bara, more preferably in the range 0.10-0.70 bara, thereby obtaining a first vapor and a concentrated urea-containing liquid stream. The first vapor contains entrained urea, e.g. about 0.10-1.0 wt. %. Typically, the urea content of the urea solution increases in the evaporation by at least 1 wt. % (percentage point, e.g. from 70 to 71 wt. % urea) by the water evaporation, or by at least 5 wt. %. For instance, the formed concentrated urea-containing liquid stream contains at least 75 wt. % urea or at least 80 wt. % urea, e.g. up to 99 wt. % urea; the stream can be referred to as concentrated urea solution and as urea melt.

The evaporation unit may also be referred to as a pre-evaporator and may be part of an integrated evaporator-condenser, wherein the urea solution to be heated is brought in heat exchanging contact with a condensing gas stream of a carbamate condenser. For instance the urea solution with a pressure of less than 1.0 bara is in heat exchanging contact with an MP gas stream comprising $NH_3$ and $CO_2$ which is condensed to form MP carbamate solution. The MP gas stream originates for example from the MP treatment of the urea synthesis solution. The process optionally comprises additional concentration steps of the first urea solution by water evaporation downstream and upstream of the mentioned concentration step.

In a preferred embodiment, the water evaporation is entirely provided by heat exchange against condensing vapor from MP treatment of stripped urea solution from a urea synthesis section comprising an HP $CO_2$ stripper. This provides for an energy efficient process in terms of LP or MP steam import of the process.

The water evaporation may be carried out by two or more evaporation units arranged in parallel or in series, or a combination thereof.

The formed concentrated urea-containing liquid stream, e.g. when containing less than 90 wt. % urea, is optionally further concentrated by water evaporation in one or more downstream evaporation steps. Vapor from these downstream evaporation steps may be condensed and the resulting process condensate streams are optionally joined with the first process condensate stream. However, in some embodiments, the concentrated urea-containing liquid stream is directly used without further concentration.

In embodiments, the urea solution from the LP dissociation is subjected to concentration by water evaporation in a plurality of evaporation steps in series, typically with decreasing pressures, e.g. a first evaporation step at 0.2-0.6 bara and a second evaporation step at 0.01-0.2 bara, with each evaporation steps giving a concentrated urea-containing liquid stream and a vapor stream. At least one, preferably two or more, of these vapor streams are subjected to condensation, e.g. subjected to combined condensation wherein the resulting condensate stream provides the first process condensate stream. In a further embodiment, two or more of these vapor streams from the evaporation steps are subjected to separate condensation wherein at least one of the resulting condensate streams provides the first process condensate stream, or at least two of the resulting condensate streams are combined to provide the first process condensate stream, wherein the first process condensate stream is supplied to the desorption unit, preferably steam stripper.

The process may optionally comprise one or more upstream concentration steps by water evaporation, typically at a pressure of at least 1.0 bara. It is noted that also the LP dissociation step will involve the evaporation of some water.

Optionally, the process comprises combining a part or all of the concentrated urea-containing liquid with ammonium nitrate to form urea ammonium nitrate (UAN), which is a liquid fertilizer.

Optionally, the process comprises subjecting a part or all of the concentrated urea-containing liquid, suitably after a further concentration step, e.g. a vacuum evaporation step carried out at e.g. less than 0.10 bara, to finishing. Finishing refers to solidification of a concentrated urea-containing liquid, in particular a urea melt. Example finishing methods include fluidized bed granulation and prilling. The resulting solid product can be used as a fertilizer.

Optionally, the process comprises feeding a part or all of the concentrated urea-containing liquid, suitably after a further concentration step, e.g. a vacuum evaporation step carried out at e.g. less than 0.10 bara, as feedstock to a melamine plant. A combination of these uses of the concentrated urea-containing liquid is also possible.

In the invention, the concentrated urea-containing liquid is preferably not used to provide the second urea-containing solution. Preferably, the second urea-containing solution contains urea that does not originate from the concentrated urea-containing liquid. Preferably, at least 90 wt. % of the urea comprised in the second urea-containing solution does not originate from the concentrated urea-containing liquid, and more preferably no urea comprised in the second urea-containing solution originates from the concentrated urea-containing liquid. Preferably, less than 10 wt. % of the urea comprised in the concentrated urea-containing liquid is included in the second urea-containing solution.

In an example embodiment, a part or all, e.g. at least 50 wt. % or at least 90 wt. %, of the concentrated urea-containing liquid is combined with ammonium nitrate (AN), in particular ammonium nitrate solution, to form urea ammonium nitrate solution (UAN). The UAN can be used as a liquid fertilizer.

The UAN preferably comprises at least 30 wt. % AN, at least 20 wt. % urea, and at least 10 wt. % water and preferably less than 50 wt. % water. More preferably, the UAN contains 40-45 wt. % AN, 30-35 wt. % urea, and 30-20 wt. % water (with urea wt. % as including biuret for UAN). Therefore, UAN is preferably prepared from a concentrated urea liquid; additionally considering the water by-product of forming nitric acid (NA) by reacting $NH_3$ and $O_2$; this nitric acid being reacted with $NH_3$ to form AN solution in a neutralizer. By using a sufficiently concentrated urea solution for UAN production, the need to concentrate the aqueous AN solution from the AN neutralizer is advantageously minimized, which concentration by water evaporation consumes energy (steam). Moreover, any purge of excess water from the UAN production (NA production, AN production, and UAN production in total) is reduced, which is an advantage as the purge water is regularly obtained as an aqueous stream (condensate) contaminated with impurities (e.g. AN, NA), which cause a need for costly purification of the aqueous stream. In particular, water with such impurities (ammonium salts) can be not directly included in DEF products.

As a general preference, the first process condensate is not used for acid scrubbing in the present invention to avoid ammonium salts in the dilute urea solution.

In an embodiment wherein the concentrated urea solution is used for making UAN, the urea solution may contain some $NH_3$. Preferably the AN formation reaction is carried out with excess NA, which is advantageous to reduce $NH_3$ emissions from the AN neutralizer, such that the resulting AN solution or melt contains some unreacted NA (e.g. has pH 1-2) which can be neutralized by the $NH_3$ comprised in the concentrated urea solution. Optionally, a small amount of NA is added thereafter to neutralize any remaining $NH_3$ and obtain a neutral pH value.

In the process, the first vapor is subjected to condensation to form a first process condensate comprising water, urea, ammonia, and carbamate; and a non-condensed gas stream. The process condensate comprises e.g. at least 50 wt. % water, or at least 70 wt. % water, and e.g. 5 to 25 wt. % $NH_3$ and $CO_2$ in total (amounts $NH_3$ and $CO_2$ including $NH_3$ respectively $CO_2$ present as carbamate) and accordingly is water rich (very lean in carbamate). The process condensate comprises e.g. 0.10-1.0 wt. % urea. The process condensate contains a relatively large amount water (kg) per kg urea treated in the LP dissociator, possibly depending on the split ratio between UAN and DEF product, or on the mass ratio between first and second urea solution, such that sending it directly to the LPCC would result undesirably much water in the LPCC and undesirably large water recycle to the urea synthesis. It is noted that the ratio UAN to DEF product is desirably not very high such that preferably the water removed in the concentration step of first urea solution is effectively included in the DEF product while not obtaining a too dilute DEF solution.

The condensation can be carried out in one or more condensation units. A condensation unit is for instance a heat exchanger, for instance using cooling water; with gas/liquid separation. The condensation unit is typically also operated at a pressure below 1.0 bara. The condensate is e.g. brought to atmospheric pressure and subsequently the pressure is lowered for the dissociation step. The condensation may at least in part be effected by an absorber and the absorber may provide the first process condensate at least in part. For instance, a combination of a condenser and an absorber in series are used.

The non-condensed gas stream is for instance supplied using an ejector to an absorber, e.g. an atmospheric absorber. The atmospheric absorber receives for instance also a non-condensed gas stream of a carbamate condenser of the LP recovery section. The liquid from the absorber is e.g. supplied to the steam stripper.

The first urea-containing solution originates from an HP (high pressure) urea synthesis section where $CO_2$ and $NH_3$ are reacted to form urea and water in a 1:1 molar ratio, with a liquid flow connection from the synthesis section to the LP dissociator. The second urea solution usually also originates from an HP urea synthesis section with a liquid flow connection to the outlet for dilute urea solution, in particular DEF; and with a liquid flow connection from the synthesis section, preferably through an LP dissociator, to the DEF treatment unit, in particular to the steam stripper. The first and second urea solution may originate from the same urea synthesis section or from distinct synthesis sections. In an embodiment, the first and second urea solution originate both from the outlet of an HP $CO_2$ stripper. In an embodiment, the first urea solution originates from the outlet of an HP $CO_2$ stripper and the second urea solution, used for making in particular DEF, originates from the reaction zone bypassing the stripper or originating from a separate synthesis section without HP stripper (i.e. consisting of a reaction zone only in parallel to the reaction zone for the first urea solution). This is advantageous to reduce biuret content, which is formed more strongly in the HP $CO_2$ stripper, but reduces the amount of LP steam from the HP carbamate condensation.

The type of urea synthesis section is not particularly limited, for independently the first and second urea solution. The synthesis section is typically operated with a reaction zone with a pressure of at least 100 bara, more preferably at least 120 bara; typically with an N/C ratio of at least 3.0 (reaction zone urea solution outlet; $NH_3$ to $CO_2$ ratio of the theoretical initial mixture). The synthesis section can be of the type with an HP stripper and of the type without an HP stripper. A synthesis section with an HP stripper comprises a reaction zone, a stripper, and a condensation zone. Effluent from the reaction zone is provided to the stripper, gas from the stripper to the condensation zone, condensate from the condensate zone to the reaction zone, and the stripper has an outlet for striped urea solution in liquid flow connection with the LP dissociator, optionally through an MP treatment section (at 10 to 100 bara). Optionally, two or more reactors are used in series or in parallel; the same applies for condenser.

The HP stripper uses e.g. stripping with $CO_2$, e.g. a part of the $CO_2$ feed, e.g. at least 90% of the $CO_2$ feed, or stripping with $NH_3$, or thermal stripping. The stripping involves direct counter-current contacting flow between strip gas and urea solution while heating the urea solution, usually in a shell-and-tube heat exchanger with a falling film of urea solution in the tubes and with heating fluid (steam) in the shell, and with strip gas in the tubes; at a pressure of at least 80 bara or at least 100 bara. The steam in the shell is in indirect heat exchanging contact with the urea solution through the walls of the stripper tubes. The HP stripping is not steam stripping as this would cause significant amounts of water to be introduced into the reaction zone, which is detrimental for the urea yield. HP $CO_2$ stripping is preferred because of the low $NH_3$ level of the stripped solution.

In embodiments, the reaction zone and condensation zone are combined in a single vessel, e.g. a pool reactor.

The condensation zone is e.g. provided at least in part by a condenser that is a heat exchanger with gas from the stripper in a first side and cooling liquid in a second side; preferably a shell-and-tube heat exchanger, for example with gas from the stripper in the shell and with a liquid to be heated in the tubes or vice versa. Preferably, LP steam (preferably 2 to 6 bara) is raised from boiler feed water in the tubes. This LP steam can be used for the desorption, preferably steam stripping. The reactor is e.g. a vertical urea reactor with inlet at the bottom and an outlet for withdrawing urea solution or reactor effluent from an upper part of the reactor; and with trays in the reactor. A horizontal pool reactor is also possible. The reaction zone is generally operated at a pressure in a range of from 12 to 400 bara and at a temperature between 150° C. and 250° C. In a preferred embodiment, the reaction is conducted at a synthesis pressure of 130-150 bara. In a further embodiment, the entire HP synthesis section is operated at a pressure in the range of 130-150 bara.

Optionally, the first and second urea solution are subjected to MP treatment between the HP synthesis section and the LP dissociation; e.g. in combination with HP $CO_2$ stripping, and also in embodiments with no HP stripping or thermal stripping. In a preferred embodiment, a urea solution stream is supplied from the HP synthesis through the MP treatment unit and the LP dissociator and then divided in at least the first and second urea solution, with selectively the first urea solution subjected to the concentration by water evaporation in an evaporation section.

The MP treatment involves pressure reduction from HP to MP and gas/liquid separation (flashing), e.g. adiabatically or with heating, to give MP gas and MP urea solution. The MP urea solution is supplied to the LP dissociator. The heating is usually performed in a heat exchanger with steam as the heating fluid. Adiabatic flashing has advantageously no steam consumption. MP treatment is advantageous to allow an HP $CO_2$ stripper to operate with less heating (lower steam consumption) than without MP treatment between the HP stripper and LP dissociator; which is especially advantageous when preparing DEF from a part of the stripped urea solution as it may provide for a lower biuret content of the stripped urea solution. MP treatment is also regularly used for HP sections without stripping or with thermal stripping due to the higher $NH_3$ level of the urea solution from such sections.

The MP treatment e.g. involves pressure reduction of the urea solution, in particular by adiabatic flashing, e.g. by at least 20 bara, and preferably to a pressure in the range 10 to 70 bara, more preferably 20 to 40 bara. MP adiabatic flashing is advantageously energy efficient.

The MP treatment may also involve heating of the urea solution in a heat exchanger, with as heating fluid e.g. steam or a process stream. In some embodiments, MP urea solution is passed through a tube bundle of the HP carbamate condenser to effect the MP treatment, optionally with steam raised in a second tube bundle of the HP carbamate condenser.

The LP carbamate dissociation results in a gas stream containing $CO_2$, $NH_3$ and $H_2O$ that is condensed to form a carbamate solution in an LP carbamate condenser (LPCC) typically operating at the same pressure as the LP dissociator. The resulting carbamate solution is supplied, by liquid flow, from the LPCC directly or indirectly to the reaction zone of the synthesis section; giving the advantage of reactant recovery. It is desired that the carbamate solution received by the reaction zone has a low water content. Sufficient water must however be present in the LPCC to prevent carbamate crystallization. A higher water concentration is necessary with lower temperature and hence lower condensation pressure. A higher water content can also be used to obtain a more complete condensation of $NH_3$ at a given condensation temperature. The LPCC is typically a heat exchanger, e.g. against cooling water.

The preferred MP gas, containing CO2 and $NH_3$, is also subjected to condensation, in an MP carbamate condenser (MPCC) to form an MP carbamate solution. The MPCC typically receives carbamate solution from the LPCC. The MP carbamate solution is supplied to the reaction zone of the synthesis section, e.g. through an HP condenser. The MPCC is typically a heat exchanger, e.g. against cooling water, but preferably against urea solution to be heated, in particular against the urea solution that is concentrated by water evaporation. The MPCC is therefore e.g. the shell side of a shell-and-tube heat exchanger with urea solution (at less than 1.0 bara preferably) in the tubes. The MPCC is typically operated at the same pressure as the MP treatment; a pressure of at least 20 bara is advantageous to condense carbamate solution that is relatively rich in $NH_3$ and to heat the urea solution by heat exchange to sufficiently high temperature to cause water evaporation.

MP adiabatic flash of the urea solution from which both the first and second urea solution originate allows for concentrating the first urea solution by indirect heat exchange of the condensing gas from the MP flash, to a urea concentration of at least 80 wt. %. This urea concentration of at least 80 wt. % is beneficial for making UAN. The concentrated urea solution can also be further concentrated to urea melt if desired.

In the process, the first process condensate and second urea solution are combined to form a combined stream, prior, during or after the desorption of $NH_3$ and $CO_2$ from the first process condensate respectively the combined stream containing the first process condensate. As used herein, "during" means in the same piece of equipment. In this way, the water content of the first process condensate advantageously contributes to the desired high water content of the dilute urea solution (e.g. DEF). This provides an advantage compared to using demineralized water for the dilution purpose, as demineralized water production involves costs; and similarly is advantageous compared to using purified process condensate e.g. purified process condensate from UAN production (e.g. from AN production). The desorption may involve carbamate dissociation and release of the resulting $NH_3$ and $CO_2$. Usually, also free $NH_3$ is removed from the desorption.

Optionally, the first process condensate is supplied to an absorber before being combined with the second urea solution, and may take up $NH_3$ and $CO_2$ from a gas stream in the absorber.

The first process condensate, at the inlet of the desorption unit (e.g. steam stripper) for said desorption, or immediately prior to being combined with the second urea solution, e.g. in a mixing zone, in particular a mixing zone upstream of the desorption unit, contains urea; preferably the amount of urea in the first process condensation at said point is at least 100% of the urea (e.g. on wt. %) in the first process condensate at the outlet of the condensation zone or unit where the first process condensate is formed (first condenser). If a part of x % (e.g. up to 100%) of the formed first process condensate, e.g. formed in the first condenser, is combined with the second urea solution, (a*x %) of the urea in the total first process condensate is provided at the inlet of the mixing zone respectively desorption unit (preferably steam stripper) by said (part of) the first process condensate, with preferably factor a >0.8, more preferably >0.9, even more preferably >0.95 or even >0.99, e.g. up to 1.0. In other words, typically no or only a small amount of urea lost is lost in the liquid flow line from the first condenser to the mixing zone respectively to the desorption unit, which can be contrasted to the virtually complete destruction of urea in a hydrolysis unit of a WWT.

In the process, preferably the second urea solution originates from an LP carbamate dissociation step and contains urea, water, ammonia and carbamate.

For instance, the second urea solution comprises at least 30 wt. % urea, or at least 40 wt. % urea, or at least 55 wt. %, e.g. up to 75 wt. % urea, and comprises e.g. less than 50 wt. % water, e.g. max. 40 wt. % water. Accordingly, diluting the second urea solution by water addition is desirable for making DEF (with e.g. 30-50 wt. % water, balance essentially pure water). The second urea solution comprises, e.g., 55 to 75 wt. % urea, e.g. 60 to 70 wt. % urea; and 20 to 40 wt. % water, and carbamate, e.g. at least 0.5 wt. %, $CO_2$ and at least 0.5 wt. % $NH_3$; and e.g. max 2.0 wt. % $CO_2$ and e.g. max 2.0 wt. % $NH_3$ (concentrations including $CO_2$ respectively $NH_3$ present as carbamate). These composition apply to the second urea solution before the combining with the first process condensate, and preferably to the first process condensate where it is preferably split from the first urea solution.

Preferably, the second urea solution is subjected to desorption of $NH_3$ and $CO_2$ to achieve low alkalinity, in particular to reach the purity requirements for DEF. Such a treatment can be referred to as DEF treatment.

The desorption is provided by one or more selected from the group consisting of pressure reduction, heating, and stripping of the liquid by counter-current contacting flow with a gas other than $NH_3$ and $CO_2$; and gas/liquid separation. The desorption is e.g. carried out a pressure below 10 bara, preferably below 4 bara, more preferably below 1.0 bara; e.g. above 0.1 bara. Low pressures are advantageous e.g. to reduce biuret formation and to permit low temperatures.

Preferably, gas from the desorption is contacted with the urea solution that is supplied to the desorption, with gas/liquid contacting, for rectification of the composition of the gas stream, e.g. in a rectification zone that is for the second urea solution upstream of the desorption unit.

In an embodiment, the desorption is provided by a combination of pressure reduction and heating, optionally with stripping. The stripping uses e.g. air or steam as strip gas.

The second urea solution comprises, before said combining, preferably at least 30 wt. % urea, or at least 40 wt. % urea, or at least 50 wt. % urea, and usually less than 80 wt. % urea. Such urea concentrations are for instance obtained with a urea solution from an LP dissociation step.

In embodiments of the present invention steam stripping is for instance used to purify the second urea solution, before, during or after the combination with the first process condensate, wherein the steam stripping involves direct injection of steam into the second urea solution; preferably at a pressure below 1.0 bara (liquid inlet pressure) and preferably at a relatively low temperature of max. 60° C. or max. 50° C., preferably max 30° C. liquid outlet temperature; with gas/liquid separation. The low temperature is advantageous to reduce biuret formation. Steam of e.g. 2 to 6 bara is used; e.g. as saturated steam. The steam stripping is for instance carried out in a vertical vessel that comprises a liquid inlet at an upper part, a gas outlet at the top, a liquid outlet at the bottom and steam inlet at the bottom. Direct contact between the liquid and injected steam is provided at least in the bottom part of the stripper. In an example embodiment, a liquid column is maintained at least in the vessel bottom in operation of the steam stripper, and preferably a liquid/gas interface between the liquid outlet and the liquid inlet.

With other configurations of the steam stripper than a vertical vessel, references to 'bottom' refer to the liquid outlet side and references to top refer to the liquid inlet side.

In embodiments wherein the second urea solution is subjected to steam stripping before the combination with the first process condensate, the steam stripping can be carried out as is known in the art to make DEF.

In the invention, the first process condensate is subjected to desorption of $NH_3$ and $CO_2$, before, during or after the mixing with the second urea solution.

In an embodiment, the first process condensate is treated by the desorption before the mixing, i.e. separately from the second urea solution. The first process condensate contains carbamate before the treatment. In this embodiment, for instance heating in a heat exchanger is used, e.g. by indirect heat exchange (through a wall) with steam, to cause carbamate dissociation, with gas/liquid separation. In the art, carbamate dissociation by heating in a heat exchanger with gas/liquid separation, in combination with condensation (or absorption) of the gas has been used to effectively concentrate a carbamate solution (obtain a carbamate solution with higher carbamate level) for a carbamate solution from a melamine plant that is recycled to the carbamate recycle to urea synthesis (FIG. 5 of Nitrogen Issue 228, p. 48 July-August 1997, showing melamine off-gas treatment wherein carbamate solution from absorption of the off-gas is fed to a desorption column and the resulting gas to an MP absorber of a urea plant; with the second absorber operating at higher pressure than the first absorber).

In an embodiment, the first process condensate is treated by steam stripping and the second urea solution is treated by steam stripping separately in separate vessels.

In an embodiment, the first process condensate and/or the second urea solution are subjected to heating in a heat exchanger and steam stripping in series, preferably with steam stripping downstream of the heating.

In a preferred embodiment, the first process condensate and second urea solution are subjected to combined steam stripping in a single vessel, wherein the first process condensate and second urea solution are combined (mixed) upstream or inside the vessel. Preferences and details for the steam stripping are as mentioned, e.g. a liquid pressure below 1.0 bara, direct injection of steam of 2 to 6 bara into the urea-containing liquid, and a vessel with a bottom liquid outlet, bottom steam inlet, top gas outlet, and one or more liquid inlets in an upper part.

Advantageously, the combined steam stripping gives a lower urea concentration of the urea-containing liquid at the bottom of the steam stripper, which beneficially provides that a lower bottom liquid temperature is sufficient to reach a sufficiently low $NH_3$ concentration, e.g. to reach a low enough $NH_3$ level permitted by the DEF specification (in a calculated example, 83° C. bottom liquid temperature for combined steam striping to reach the $NH_3$ level according to DEF specification, compared to 90° C. for separately stripping the second urea solution of 72 wt. %). A lower liquid bottom temperature permits lower steam temperature and/or amount, and additionally advantageously reduces the biuret formation reaction and urea hydrolysis reaction in the steam stripper. Note that the hydrolysis in the steam stripper is only partial, e.g. about 10%, and therefore much lower than the intentionally complete urea hydrolysis in a WWT.

Preferably, the gas from the desorption treatment of the first process condensate, in particular from the steam stripper, more preferably from the combined steam stripping of the second urea solution and first process condensate, which contains $NH_3$ and $CO_2$ and water, is subjected to condensation to form a carbamate solution (second process condensate) in a second condensation unit, e.g. operated at a pressure of less than 4.0 bar or less than 1.0 bara, and usually at substantially the same pressure as the respective desorption unit; and e.g. at about the same pressure as the evaporation section condenser. Preferably, the second process condensate is supplied, with a liquid flow connection, directly or indirectly to the HP synthesis section, usually through the LPCC, optionally first through an atmospheric condenser and then to the LPCC. This provides the advantage that the carbamate is recovered as reactant and for improved water balance compared to sending the gas or condensate to a UAN plant. Furthermore, the water fraction of the condensate is used to prevent carbamate crystallization of the LPCC, thereby mitigating a possible need for water import in the LPCC. By comparison, in a prior art urea plant, the water component of the lean carbamate solution from the WWT, which lean carbamate solution is supplied to the LPCC, is used to prevent carbamate crystallization in the LPCC.

The purification section condensation unit may be provided by a condenser and/or absorber, e.g. by a condenser and an absorber in series. The condenser is e.g. a heat exchanger, in particular a shell-and-tube heat exchanger.

Desirably, the gas from the desorption treatment has a low water fraction, which can improve urea yield in the synthesis and reduces the amount of pure water needed for diluting the second urea solution to prepare DEF. Preferably, the desorption is steam stripping for both the first process condensate and the second urea solution, as this results in a relatively low water content of the gas, in particular by water vapor from the steam stripper bottom being absorbed in incoming liquid streams in an upper compartment of the steam stripper (i.e. rectifying the gas stream from the steam stripper). Steam stripping is also energy efficient. To promote the rectification of the gas stream composition, the steam stripper preferably comprises a gas/liquid contacting device, e.g. a (structured) bed in an upper compartment, or trays, with the liquid inlet and gas outlet above the bed and with the steam inlet and liquid outlet below the bed.

In operation the liquid flows down through contacting device (e.g. structured bed) and the gas flows up through the device (structured bed); preferably a liquid/gas interface is maintained below the bed, in particular if a liquid column is maintained in the bottom part of the stripper. Gas from the stripper bottom is contacted with the liquid in the bed and thereby the water content of the gas is reduced.

Preferably, all second process condensate is supplied to the synthesis section as carbamate solution, and preferably substantially all of the gas from the desorption unit, preferably steam stripper, is condensed into said second process condensate, or more generally into one or more carbamate solutions that are recycled to the synthesis section; in particular if the HP synthesis section uses $CO_2$ stripping. This provides the advantage that no separate ammonia recycle flow line needs to be used.

In an advantageous embodiment, which is however optional, the second process condensate is supplied to the LP dissociation unit, in particular to the liquid inlet of the LP dissociation unit for urea solution, and is accordingly combined with the first urea solution. The liquid outlet of the LP dissociation is preferably in liquid flow connection for urea solution with an inlet of the dissociation unit. The mixing unit for first process condensate and second urea solution is preferably upstream of the dissociation unit. The second urea solution originates from said LP dissociation unit. This embodiment is especially advantageous if the desorption is effected by heating and/or pressure reduction without stripping, in particular without steam stripping. By the operation of the LP dissociator, the $NH_3$ (and $CO_2$) comprised in the second process condensate are preferentially removed from the liquid, relative to water, and released as gas that is sent to the LP carbamate condenser. Thereby the amount of water in the carbamate solution from the LPCC is advantageously lower compared to sending the second process condensate directly to the LPCC. The remaining water fraction at the liquid outlet of the LP dissociation unit is divided over the first and second urea solution, as the urea solution from the LP dissociation unit is split to provide the first and the second urea solution. This embodiment is especially advantageous with relatively high ratio of second to first urea solution, e.g. above 50:50 (on the basis of kg urea) (e.g. ratio DEF to UAN product) because the water from the second process condensate that remains in the urea solution at the liquid outlet of the LP dissociation is then for a large part advantageously included in the dilute urea solution, e.g. the DEF product. Hence, in this preferred embodiment, the synergistic benefit is obtained that the water fraction of the second process condensate is thus prevented from ending up where it is in fact detrimental (carbamate recycle) and ends up actually where the presence of water is desired, viz. in the DEF product.

Preferably, the first process condensate as supplied to the steam stripper has a lower temperature than the second urea solution, e.g. at least 10° C. lower, or at least 20° C. and these streams are introduced into the steam stripper through separate inlets. For instance, the first condensate is obtained by condensation at relatively low temperature, e.g. 10 to 50° C., and the second urea solution is obtained from an LP dissociator and is maintained at elevated temperature, e.g. above 70° C. or above 80° C. because of the urea content (above 60 wt. %). Furthermore, usually the first process condensate has a higher carbamate concentration than the second (and first) urea solution, by the effect of the evaporation step of the first urea solution.

Preferably, the first process condensate inlet of the steam stripper is arranged above the inlet for second urea solution, with more preferably the steam stripper comprising a (structured) bed between these inlets; in addition to a (structured) bed below the urea solution inlet. This provides the advantage of a relatively low water content of the gas from the steam stripper. In particular, the contact between the gas (from the lower structured bed with the mixture of second urea solution and first process condensate) and the relatively cold first process condensate, which contacting occurs in the upper structured bed, i.e. downstream for the gas flow relative to the lower structured bed and upstream for liquid, promotes water absorption in the liquid, and this contact also promotes desorption of $NH_3$ and $CO_2$ from the first process condensate which is relatively rich in carbamate compared to the liquid in the lower bed. The lower water content of the gas from the steam stripper is advantageous when the gas after condensation is supplied to the urea synthesis, the water content is advantageously still sufficient for operating the LPCC.

Preferably, all the water formed in the urea synthesis is included in the concentrated urea solution and the dilute urea solution in total, e.g. in the concentrated urea solution and DEF product in total. Optionally, some demineralized water or other clean water stream is added to the urea solution from the steam stripper to achieve a desired urea concentration, e.g. the added water is max. 5% of the total amount of water after adding it.

In an embodiment, the process comprises splitting a urea solution stream originating from an LP dissociator into (at least) the first and second urea solution. In an embodiment the process comprises splitting a urea solution stream from an HP synthesis section into (at least) the first and the second urea solution, which are then separately processed. In a further embodiment, the split is already inside the HP synthesis section. In yet a further embodiment, parallel synthesis sections are used. Generally, the split is before the evaporation step of the first urea solution at a pressure below 1.0 bara.

In an embodiment wherein the first urea solution is concentrated to at least 90 wt. % urea or at least 95 wt. % urea (including biuret), e.g. for making solid urea products, preferably the ratio on the basis of the weight urea of the second to the first urea solution (DEF to concentrated urea product) is at least 35:65, more preferably at least 40:60. This is advantageous for producing DEF without excess first process condensate.

In an embodiment wherein the first urea solution is concentrated to at least 75 wt. % urea, e.g. 75-80 wt. % urea (e.g. for making UAN), preferably the ratio of the second to the first urea solution (DEF to concentrated urea product) is at least 10:90, more preferably at least 15:85 on the basis of weight urea. This is advantageous for producing DEF without having excess first process condensate.

The invention pertains to a plant for the production of urea. The plant comprises a high pressure urea synthesis section, e.g. with or without an HP stripper, preferably with HP $CO_2$ stripping. The plant further comprises a low pressure dissociation unit connected to receive urea solution from the high pressure urea synthesis section, optionally with an MP treatment unit, such as an adiabatic flash unit in the liquid flow line from the synthesis section to the LP dissociation unit. The LP dissociation unit is typically a heat exchanger, in particular a shell-and-tube heat exchanger, with gas/liquid separation, and usually with a rectification column for counter-current direct contact between urea solution flowing to the heat exchanger and gas from the heat exchanger. The plant further comprises an evaporation unit connected to receive urea solution from the low pressure dissociation unit and having an outlet for a first vapor and an outlet for a concentrated urea-containing liquid stream. The evaporation unit is e.g. provided as a compartment of a shell-and-tube heat exchanger, with the second compartment being a condenser, in particular for gas from the MP treatment section. The plant further comprises a first condensation unit connected to receive the first vapor from the evaporation unit. The plant further comprises a mixing zone and a desorption unit configured to combine a first process condensate from the first condensation unit with a second urea solution and to subject the first process condensate to desorption of $NH_3$ and $CO_2$ before, during, or after said combining; highly preferably during or after said combining (i.e. desorption treatment of the combined stream, or during the combination of the streams. During, as used herein, means in the same vessel or unit. The desorption unit is preferably a steam stripper. The steam stripper is configured for the injection of steam into a mixture of the first process condensate and the second urea solution. Hence, the steam stripper comprises a zone or chamber for receiving in operation both the first process condensate and steam, and preferably also the second urea solution.

Preferably, the steam stripper is a vertical vessel that comprises a first inlet for the first process condensate, and a second inlet for the second urea solution, a bottom inlet for steam, a bottom outlet for liquid, a top gas outlet, wherein the first inlet is arranged higher than the second inlet, wherein the steam stripper preferably comprises a first structured bed between the bottom steam inlet and the second inlet, and a second structured bed between the first and second inlet.

Preferably the plant comprises a liquid flow line for the first process condensate from the first condensation unit to the mixing zone, and the mixing zone is configured to also receive first process condensate from the first condensation unit. The mixing zone and desorption unit are preferably provided by the same vessel. The liquid flow line preferably bypasses the WWT, if the plant comprises such a section.

Preferably the plant comprises a second condensation unit connected to receive a gas stream from the desorption unit, preferably from the steam stripper. The second condensation unit has an outlet for a second process condensate.

The plant preferably also comprises a low pressure carbamate condenser having an inlet connected to receive a gas stream from the low pressure dissociation unit, an inlet connected to receive by liquid flow said second process condensate; and a condensate outlet that is in liquid flow connection with an inlet of the high pressure synthesis section, preferably through an MP carbamate condenser.

The plant preferably is also for the production of urea ammonium nitrate (UAN), a liquid fertilizer, and comprises an ammonium nitrate production unit wherein aqueous nitric acid is reacted with $NH_3$ to form ammonium nitrate in operation, and a urea ammonium nitrate (UAN) production unit where in operation the concentrated urea-containing liquid stream is combined with said ammonium nitrate to form urea ammonium nitrate liquid fertilizer.

The present disclosure also pertains to a method of modifying an existing urea plant, the exiting plant comprising the high pressure urea synthesis section; the low pressure dissociation unit connected to receive urea solution from the high pressure urea synthesis section; the evaporation unit; the first condensation unit connected to receive the first vapor from the evaporation unit; and a wastewater treatment section connected to receive a first process condensate from the first condensation unit. The method involves providing the plant with a liquid flow connection for the first process condensate from the first condensation unit to a mixing zone to combine the first process condensate with a second urea solution and to subject the resulting combined stream to desorption of $NH_3$ and $CO_2$ before, during, or after said combining; thereby obtaining a modified plant. The modified plant is preferably an inventive plant.

FIG. 1 schematically illustrates an example process and plant according to the invention. A first urea solution (1) comprises urea, water, ammonia, and carbamate and is subjected to a low pressure carbamate decomposition step (LPD) at a pressure of 1.0 to 10 bara to give an LP urea solution (1a), and a gas stream (not shown). The LP urea solution is subjected to concentration by water evaporation (EV) at a pressure below 1.0 bara, giving a concentrated urea-containing liquid stream (2) and a first vapor (3). The first vapor (3) is subjected to condensation in a condenser (C) thereby forming a first process condensate (4) comprising water, urea, carbamate, and ammonia; and a vapor stream (not shown). The first process condensate (4) is combined (M) with a second urea-containing solution (5), that contains at least 30 wt. % urea, and the combined stream (7) is subjected to a dissociation step (D) which gives a gas stream (not shown) and a dilute urea solution (6) that is suitable for use as Diesel Exhaust Fluid optionally after dilution with water. The concentrated urea-containing liquid stream (2) is used for making UAN liquid fertilizer (UAN).

Figure 2:
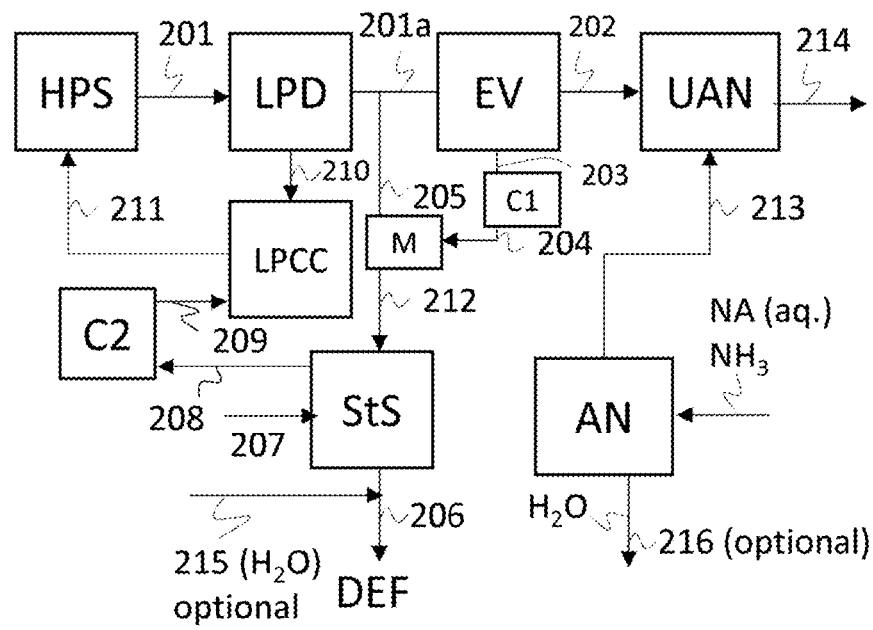
FIG. 2 schematically illustrates an example process and plant according to the invention.
Any embodiments illustrated in the figures are examples only and do not limit the invention.

FIG. 2 schematically illustrates an example process and plant according to the invention. The plant comprises a high pressure urea synthesis section (HPS) with an outlet for a urea solution (201) that is sent, preferably through an MP treatment section (not shown), more preferably through an MP adiabatic flash unit, to a low pressure dissociation unit (LPD), which is e.g. a heat exchanger. Urea solution (201a) from the LP dissociation unit is sent, preferably with LP adiabatic $CO_2$ striping and atmospheric flashing (not shown), to an evaporation unit (EV) which is preferably a vacuum evaporation stage. The evaporation unit has an outlet for the concentrated urea-containing liquid stream (202) that is preferably used for making UAN liquid fertilizer (214). The first vapor (203) from the evaporation unit is sent to a first condensation unit (C1). The resulting first process condensate (204) is sent to a mixing zone where it is combined with a second urea solution (205); in particular without passing through a WWT that comprises a hydrolysis unit. If the plant comprises a WWT, the liquid flow line for the first process condensate bypasses the WWT, in particular the hydrolysis unit thereof. Preferably, as illustrated, the urea solution from the LP dissociation is split into a first part sent to the evaporation unit and a second part sent to the mixing zone. In other embodiments, for example the urea solution from the synthesis section is split in the first and second part that are treated separately in LP dissociator, optionally with MP treatment. In still other embodiments, the synthesis section has two outlets for urea solution, e.g. one from the stripper and the other from the reactor, and the first and second urea solution originate from respective outlets. In further embodiments, the plant comprises two synthesis sections in parallel, and the first and second urea solution originate from respective synthesis sections. For example, a synthesis section with HP stripping and a synthesis section without HP stripping are used in parallel. In embodiments with two LP dissociation units in parallel, a single combined LP carbamate condenser may receive gas from both, or two dedicated LP carbamate condensers can be used in parallel.

The combined stream (212) from the mixing zone is sent to a desorption unit, which is preferably a steam stripper (StS), which unit is configured to subject the first process condensate (204) to desorption of $NH_3$ and $CO_2$ before or during said mixing with the second urea solution (205). Hence the mixing zone (M) is optionally provided as a zone inside the steam stripper (StS), or as a separate unit upstream of the steam stripper. In an alternative embodiment (not shown) the first process condensate (204) is first subjected to desorption of $NH_3$ and $CO_2$ and then combined with the second urea solution (205). From the steam stripper, a dilute urea solution (206) is obtained that is suitable for use as DEF, with optional some dilution with a small amount of demineralized water (215) from a utility plant. The steam stripper is configured for injection of steam (207) into the urea solution.

The plant preferably comprises a second condensation unit (C2) connected to receive a gas stream (208) from the dissociation unit, preferably from the steam stripper. The second condensation unit has an outlet for a second process condensate (209). The plant preferably comprises a low pressure carbamate condenser (LPCC) having an inlet to receive a gas stream (210) from the low pressure dissociation unit (LPD), an inlet configured to receive by liquid flow said second process condensate (209), and a condensate outlet (211) in liquid flow connection with an inlet of the high pressure synthesis section, preferably through an MP carbamate condenser receiving gas from the MP treatment.

The plant, as illustrated, preferably further comprises an ammonium nitrate production unit (AN) where aqueous nitric acid is reacted with $NH_3$ to form ammonium nitrate (213), and a urea ammonium nitrate (UAN) production unit where the concentrated urea-containing liquid stream (202) is combined with said ammonium nitrate (213) to form urea ammonium nitrate liquid fertilizer (214). The AN production optionally has an excess water outlet (216).

Embodiments wherein a fluid (liquid, gas) or stream is supplied to a unit or step, include embodiments wherein a fraction or part of that fluid is supplied to the unit or step, in particular include embodiments that comprise splitting the fluid in a plurality of fractions having the same composition and supplying one, or some but not all, of the fractions to the unit or step. In other words, a purge of a part of a fluid or stream is generally permitted, even where not expressly specified. For instance, at least 90 wt. % of the recited stream is subjected to the recited step.

Terms such as, e.g., "usually" and "typically" indicate features that are used in many embodiments but that are not mandatory in all embodiments.

HP indicates high pressure, e.g. above 100 bar, MP—medium pressure, e.g. 10 to 100 bar; LP—low pressure, e.g. 1.0 to 10 bara, preferably 2.0 to 8.0 bara.

Carbamate indicates ammonium carbamate, and includes carbonate species in aqueous solutions, as the term is used in the art.

The process is preferably carried out in the plant of the invention. The plant is preferably suitable for the process of the invention. All preferences and details for units and connections mentioned in connection with the process, apply equally for the plant, and vice versa.

EXAMPLES

The invention will now be further illustrated with the following non-limiting example.

Example 1

A urea plant was operated with an HP synthesis section with a HP $CO_2$ stripper. The stripped urea solution was adiabatically flashed to MP pressure of 25 bara, and subjected to LP dissociation at 5 bara, with thereafter adiabatic $CO_2$ stripping with 5% of the total $CO_2$ feed and atmospheric flashing, to obtain after the flashing a urea solution comprising 65 wt. % urea including biuret, about 32 wt. % water, 1.4 wt. % $NH_3$ and 1.2 wt. % $CO_2$ ($NH_3$ and $CO_2$ amounts including as carbamate).

The urea solution was divided in a first urea solution used for making UAN (82% of total urea) and the second urea solution used for making DEF. The first part was subjected to evaporation at 0.45 bara to increase the urea concentration (including biuret) from 65 wt. % (after flashing) to 78 wt. %, 95° C., by heat exchange against condensing gas from the MP flash in the MP carbamate condenser MPCC; the resulting concentrated urea solution was combined with an AN solution/melt to make UAN with 34 wt. % urea, 46 wt. % AN and about 20 wt. % water. Condensate from the evaporation section (first process condensate) contained 0.5 wt. % entrained urea which is 0.53 wt. % of the urea in the DEF product.

The first process condensate was supplied, to a steam stripper operated at 0.45 bara liquid outlet pressure; the condensate had a condensate temperature of 45° C. before it was mixed with second urea solution having a temperature of about 100° C. before the mixing, with the resulting liquid mixture entering the steam stripper at 75° C. The steam stripper used LP steam of 4.5 bara, depressurized to 0.45 bara in the steam stripper. The urea solution from the steam stripper contained 57 wt. % urea, about 42 wt. % water, and had alkalinity as $NH_3$ below of less than 0.20 wt. % $NH_3$; and carbonate (carbamate) less than 0.1 wt. %; and a temperature of max. 50° C., normally about 25° C. which is advantageously low to reduce biuret formation and was obtained as DEF solution after final adjustment of the urea concentration.

The vapor from the steam stripper had the following composition: 2.7 wt. % $NH_3$, 2.1 wt. % $CO_2$, balance $H_2O$; the amount of vapor from the steam stripper is 0.155 kg vapor per kg of urea in urea solution in the steam stripper.

The vapor was condensed at 0.45 bara, to form a carbamate solution (second process condensate). The second process condensate was supplied through the atmospheric condenser to the LPCC which operated at about 4 bara outlet pressure.

Vapor from the atmospheric flashing was also condensed and supplied to the LPCC. Gas from the LP dissociation was also supplied to the LPCC. The water content of the carbamate solution from the LPCC was 32 wt. % water, i.e. not too high. The carbamate solution was supplied to the MPCC and from there to the reaction zone of the urea synthesis section.

The amount of steam raised in the HP carbamate condenser of the synthesis section (HPCC) was 10 metric tons per hour of which 440 kg/hr is used at the steam stripper. Substantially all by-product water formed in the urea synthesis was included in the DEF and concentrated urea solution in total with minor losses through the vents of suitable absorbers.

In a comparative process, the condensate from the evaporation section (first process condensate) is treated in a WWT and purified condensate from the WWT is combined with the second urea solution downstream of the steam stripper, and lean carbamate solution from the WWT is supplied to the LPCC. In this comparative process, the urea comprised in the first process condensate is hydrolysed, and the hydrolysis unit of the WWT uses HP steam (>20 bar) in an amount of about 0.055 kg steam/kg condensate. This amount of HP steam is fully saved in the inventive process. The amount of LP steam needed in the inventive process steam stripping is about 0.15 to 0.2 kg LP steam per kg of urea in the urea solution from the steam stripper, i.e. kg urea in the DEF product, and this LP steam is covered by the LP steam formed in the HPCC.

The invention claimed is:
1. A process of preparing a concentrated urea-containing liquid stream, the process comprising:

subjecting a first urea-containing solution which is a urea solution comprising urea, water, ammonia, and carbamate to a low pressure carbamate decomposition step at a pressure of 1.0 to 10 bara and subsequently at least in part to concentration by water evaporation, the water evaporation giving a concentrated urea-containing liquid stream and a first vapor, wherein the water evaporation is carried out at a pressure below 1.0 bara;

subjecting the first vapor to condensation thereby forming a first process condensate comprising water, urea, carbamate, and ammonia; and a) combining the first process condensate with a second urea-containing solution that contains at least 30 wt. % urea to form a mixture, and thereafter desorbing $NH_3$ and $CO_2$ from the mixture to form a dilute urea solution, or b) combining the first process condensate with a second urea-containing solution that contains at least 30 wt. % urea to form a mixture and simultaneously desorbing $NH_3$ and $CO_2$ from the mixture to form a dilute urea solution; or c) desorbing $NH_3$ and $CO_2$ from the first process condensate and subsequently mixing the first process condensate with a second urea-containing solution that contains at least 30 wt. % urea to form a dilute urea solution, wherein the dilute urea solution formed in a), b) or c) has a molar ratio of water to urea above 1.0 and/or comprises at least 25 wt. % water.

2. A process according to claim 1, wherein the dilute urea solution is a low alkalinity urea solution wherein the low alkalinity is defined as having an $NH_3$ weight concentration of less than 0.62% of the urea weight concentration of the low alkalinity urea solution.

3. The process according to claim 1, wherein the desorbing of $NH_3$ and $CO_2$ involves one or more selected from the group consisting of pressure reduction, heating, and stripping of the liquid by counter-current contact with a gas other than $NH_3$ and $CO_2$; and the desorbing also comprises gas/liquid separation.

4. The process according to claim 3, comprising combining the first process condensate with the second urea solution and subjecting the resulting combined stream to steam stripping by direct counter-current contact between the combined stream and steam to desorb $NH_3$ and $CO_2$ from the combined stream thereby yielding the dilute urea solution and a gas stream.

5. The process according to claim 4, comprising subjecting the gas stream from the steam stripper to condensation, giving a second process condensate, and supplying the second process condensate by liquid flow, directly or indirectly, to an LP carbamate condenser that also receives a gas stream from the low pressure carbamate decomposition step.

6. The process according to claim 5, wherein the steam stripping is carried out in a steam stripper, wherein the steam stripper is a vertical vessel having an upper part, a top, and a bottom, and comprising an inlet for the first process condensate and a separate inlet for the second urea solution, both in the upper part of the vessel, and comprising a gas outlet at the top of the vessel, a liquid outlet at the bottom of the vessel and a steam inlet at the bottom of the vessel, wherein the inlet for the first process condensate is arranged above and vertically spaced apart from the inlet for the second urea solution.

7. The process according to claim 6, wherein the steam stripper comprises a structured bed between the inlet for the first process condensate and the separate inlet for the second urea solution.

8. The process according to claim 1, further comprising combining the concentrated urea-containing liquid stream with ammonium nitrate to form a urea ammonium nitrate liquid fertilizer (UAN).

9. A plant for the production of urea, comprising:
a high pressure urea synthesis section;
a low pressure dissociation unit and an evaporation unit connected such that a first urea solution flows from the high pressure urea synthesis section through the low pressure dissociation unit to the evaporation unit, wherein the low dissociation unit comprises an outlet for a gas stream, wherein the evaporation unit comprises an outlet for a first vapor and an outlet for a concentrated urea-containing liquid stream;
a first condensation unit connected to receive the first vapor from the evaporation unit;
a mixing zone and a desorption unit configured to combine a first process condensate from the first condensation unit with a second urea solution and to subject the first process condensate to desorption of $NH_3$ and $CO_2$ before, during, or after said combining.

10. The plant according to claim 9, comprising a liquid flow line for the first process condensate from the first condensation unit to the mixing zone, the mixing zone configured to also receive the first process condensate from the first condensation unit.

11. The plant according to claim 9, wherein the desorption unit is a steam stripper configured for the injection of steam into a mixture of the first process condensate and the second urea solution.

12. The plant according to claim 11, wherein the steam stripper is a vertical vessel that comprises a first inlet for the first process condensate, and a second inlet for the second urea solution, a bottom inlet for steam, a bottom outlet for liquid, and a top gas outlet, wherein the first inlet is arranged higher than the second inlet.

13. The plant according to claim 9, comprising:
a second condensation unit connected to receive a gas stream from the desorption unit, and having an outlet for a second process condensate;
a low pressure carbamate condenser having an inlet to receive the gas stream from the low pressure dissociation unit, an inlet configured to receive by liquid flow said second process condensate; and a condensate outlet in liquid flow connection with an inlet of the high pressure synthesis section.

14. A method of modifying an existing urea plant, the existing plant comprising:
a high pressure urea synthesis section;
a low pressure dissociation unit and an evaporation unit connected such that a first urea solution flows from the high pressure urea synthesis section through the low pressure dissociation unit to the evaporation unit, wherein the evaporation unit comprises an outlet for a first vapor and an outlet for a concentrated urea-containing liquid stream;
a first condensation unit connected to receive the first vapor from the evaporation unit;
a wastewater treatment section connected to receive a first process condensate from from the first condensation unit;
wherein the method comprises:
providing the plant with a liquid flow connection for the first process condensate from the first condensation unit to a mixing zone and a desorption unit, wherein the mixing zone and the desorption unit are configured to combine the first process condensate with a second urea solution and to subject the resulting combined stream to desorption of $NH_3$ and $CO_2$ before, during, or after said combining.

15. The process of claim 1, wherein the dilute urea solution is suitable for NOx abatement.

16. The process of claim 15, wherein the dilute urea solution is for use as Diesel Exhaust Fluid optionally after dilution with water.

17. The process of claim 6, wherein the vessel comprises a structured bed below the inlet for the second urea solution.

18. The plant of claim 9, wherein the plant is suitable for the process of claim 1.

19. The plant of claim 10, wherein the mixing zone and desorption unit are provided by the same vessel.

20. The plant of claim 12, wherein the steam stripper comprises a first structured bed between the bottom steam inlet and the second inlet, and a second structured bed between the first and second inlet.

21. The plant of claim 13, wherein the desorption unit is a steam stripper configured for the injection of steam into a mixture of the first process condensate and the second urea solution.

* * * * *